United States Patent [19]

Davis

[11] 4,307,140
[45] Dec. 22, 1981

[54] ABRASIVE RESISTANT LAMINATED ARTICLE AND METHOD OF MANUFACTURE

[76] Inventor: Thomas E. Davis, 2780 Benedict La., Rochester, Mich. 48063

[21] Appl. No.: 174,094

[22] Filed: Jul. 31, 1980

[51] Int. Cl.³ .......................... B32B 3/00; B32B 5/08; B32B 5/16; B32B 31/00
[52] U.S. Cl. ........................................ 428/86; 52/385; 52/389; 156/276; 264/274; 428/44; 428/49; 428/119; 428/120; 428/414; 428/415; 428/416
[58] Field of Search ...................... 428/44, 45, 46, 47, 428/48, 49, 50, 51, 86, 413, 414, 415, 416, 417, 425.6, 119, 120; 156/276; 264/112, 113, 274; 52/384, 385, 386, 389, 390

[56] References Cited

U.S. PATENT DOCUMENTS

| | | | |
|---|---|---|---|
| 2,887,867 | 5/1959 | Burchenal et al. | 428/47 |
| 2,931,751 | 4/1960 | Du Fresne | 428/256 |
| 3,433,284 | 3/1969 | Webbere et al. | 264/274 |
| 3,444,033 | 5/1969 | King | 428/89 |
| 3,646,180 | 2/1972 | Winnick | 428/89 |
| 3,715,417 | 2/1973 | Pope | 428/49 |
| 3,884,737 | 5/1975 | Bransford, Jr. | 428/45 |
| 3,900,650 | 8/1975 | Sedore | 428/86 |
| 4,060,581 | 11/1977 | Darby et al. | 264/274 |
| 4,115,501 | 9/1978 | Yano | 264/133 |
| 4,260,445 | 4/1981 | Mayumi et al. | 428/86 |

Primary Examiner—William J. Van Balen
Attorney, Agent, or Firm—Jay C. Taylor; Neal A. Waldrop

[57] ABSTRACT

A laminated article comprising a plurality of abrasive resistant ceramic tiles secured to an elastomeric polyurethane cushioning support by means of a multitude of short thin fibers having major portions thereof embedded within an epoxy resin bonded to the tiles is fabricated by applying a thin layer of the resin in an uncured liquid phase to the tiles, applying a coating of the fibers to the liquid resin such that minor portions of the fibers in contact with the resin are wet thereby and the remaining major portions of the fibers extend from the resin layer, curing the resin to secure the fibers therein and to bond the resin to the tiles, applying a layer of a thermosetting polyurethane in an unpolymerized liquid phase to the fiber impregnated resin layer, and thereafter curing the polyurethane layer.

26 Claims, 13 Drawing Figures

ABRASIVE RESISTANT LAMINATED ARTICLE AND METHOD OF MANUFACTURE

BACKGROUND AND OBJECTS OF THE INVENTION

The present invention relates to improved shock and abrasive resistant laminated articles and to their manufacture for use in numerous applications where resistance to abrasion or the combined qualities of impact and wear resistance are required, such as in road scrapers and snow plows by way of example, and in particular for use in modular panels adapted to be assembled together and secured to the floor and walls of chutes, hoppers, bins and the like to provide an area cover or liner in sliding contact with such materials as crushed rock, coal, ore, grain and other abrasive aggregates involved in the mining, foundry, milling, and other material handling industries.

The superior resistance of polyurethane and aluminum oxide ceramics to abrasion has long been recognized. It has been common to utilize such materials in panels for lining surfaces subject to unusual abrasion. A particular form of ceramic known as "weldable tile" has been secured by welding to a steel substrate to provide a panel module. A number of such modules would then be welded or bolted in side-by-side relationship to the floor or wall to be protected. In the alternative, a multitude of approximately four inch square tiles would be laid in juxtaposition with each other to cover a supporting substrate such as a steel plate to which they were secured by an epoxy cement.

Although the abrasion resistance of both the tile and polyurethane is many times that of steel, and the tile is even superior to polyurethane, the ceramic tile available for use as a wear resistant liner is extremely brittle and susceptible to chipping and breakage. Its use has accordingly been limited to situations where the liner is not subject to appreciable shock. Also when the tile cemented to a substrate eventually wears, it is frequently impractical to remove the worn tile. As a result, the entire substrate must be removed and replaced at considerable expense. When the tile is welded to a sheet steel substrate, the heat of the welding frequently stresses the tile and increases its susceptibility to breakage by subsequent impact. The steel substrate thus had to be particularly heavy and thick, as for example on the order of a quarter inch even for light duty panels, in order to provide the necessary rigidity to prevent its flexing and the consequent cracking of the stressed tile.

Attempts have been made to secure abrasive resistant ceramic tile to a cushioning support capable of absorbing shock and reducing tile breakage. Heretofore there has been no satisfactory means for bonding the tile to an elastomeric cushioning support, and in particular to a polyurethane support having the abrasion resistance, elasticity, tensile strength, and tear resistance that render it especially suitable for the cushioning support. Although various polyurethane primers and cements were known, their use for securing tile to polyurethane was complex and costly and required carefully controlled conditions in order to avoid unpredictable and inadequate bonding.

Important objects of the present invention are to provide an economical and readily controlled method for achieving a superior bond between an elastomer, such as a polymerized polyurethane, and smooth surfaces, including sheet steel and abrasion resistant ceramic tile; to provide improved laminated articles of manufacture by the method described herein, which are capable of withstanding severe abrasion; and in particular to provide improved means for bonding brittle abrasive resistant ceramic tile to an elastomeric cushioning support so as to reduce tile breakage and enable the provision of an improved modular panel that may be replacably installed with a plurality of similar panels to provide an abrasive and shock resistant area cover or liner.

Another object is to provide an improved impact and abrasion resistant article of manufacture comprising a ceramic tile positively bonded to a shock absorbing polyurethane base, which in turn if desired is also positively bonded to a hard smooth surfaced support such as sheet steel. Welding operations and the consequent internal stressing of the tile by welding heat are thus avoided and the sheet steel substrate need not provide the rigidity that would otherwise be required. The substrate may accordingly be a light-weight steel sheet to which attachment studs may be welded, or it may be dispensed with entirely in many applications. In any event, the elastomeric support afforded by the polyurethane base materially increases the resistance of the ceramic tile to breakage by impact.

Another important object of the invention is to provide improved means for bonding a polymerized polyurethane layer to a member having a smooth hard surface, wherein the bond comprises a multitude of very short thin fibers partially embedded in the surface of the polyurethane and also in a thin adhesive such as an epoxy resin layer bonded in turn to the smooth surface to complete a laminated article.

Another object is to provide an improved method of manufacturing such an article wherein the smooth surface is provided with a thin coating amounting to approximately two or three thousandths of an inch in thickness of a liquid uncured epoxy resin capable of bonding firmly to the smooth surface when cured thereon. The liquid resin is then dusted with a multitude of the short fibers having a length approximately ten times the thickness of the liquid resin layer, whereby a minor portion of each of the separate fibers is wet by the liquid resin and immersed therein. The remaining major portion of each fiber will of course project from the resin. The resin is then at least partially cured to firmly grip the fibers embedded therein, whereupon any fibers that were not in contact with the wet resin are blown from the cured resin coating to assure that a portion of each fiber remaining is bonded to the resin layer. Thereafter an uncured liquid polyurethane is forced under pressure against the cured resin layer to embed the aforesaid remaining major portion of the fibers within the uncured polyurethane. The latter is then cured with the fibers embedded therein to complete the bond between the polyurethane and the aforesaid smooth hard surface.

Although the cured polyurethane adheres to most smooth surfaces, including the epoxy resin and such synthetics as nylon and rayon from which the aforesaid fibers are preferably formed, the adhesion obtained heretofore was inadequate for articles employed for use and subject to the abuse contemplated herein. It is accordingly a concept of the present invention to effect the bond between the resin and polyurethane by means of fibers having a diameter so small that the tensile strength of any one fiber is on the order of magnitude of the adhesive force between the polyurethane and that fiber. Inasmuch as the adhesion between the fiber and the polyurethane is proportional to the surface area or circumference of the fiber, when a fiber is split longitudinally into a multitude of smaller diameter fibers, the total periphery of the resulting fibers and the consequent adhesion to the polyurethane may be increased greatly without effecting the total cross-sectional area or tensile strength of the fibers.

Other objects are accordingly to utilize fibers such as nylon or rayon sufficiently small in diameter that as many as approximately 300,000 fibers per square inch may be embedded in the epoxy resin, and to provide electrostatic means for orienting the fibers in the resin to reduce their matting and to assure that the major portions of the lengths of the fibers extend outward from the resin layer to enhance their bonding to the polyurethane.

Another and more specific object is to preheat the member having the smooth hard surface prior to applying the liquid resin, thereby to reduce the viscosity of the liquid resin when it is thereafter applied and to allow any excess resin to drip or drain from the member.

Another object is to provide a method substantially as described above for fabricating an abrasion and shock resistant composite panel comprising an elastomeric cushioning support of polyurethane having a plurality of ceramic tiles bonded thereon and spaced from a sheet steel backing also bonded to the polyurethane. The sheet steel backing and the tiles with the cured epoxy resin layer and adhering fibers are supported in an injection mold cavity. The tiles are arranged in side-by-side and slightly spaced relationship with their fiber covered surfaces confronting and spaced from a similar fiber covered surface of the sheet steel backing to provide a space in the mold cavity to be filled with polyurethane. Uncured polyurethane in a liquid state is then injected by the aforesaid pressure into the latter space to fill the same and force the polyurethane into the spaces between the tiles and against the fiber covered surfaces to embed the extending portions of the fibers into the adjacent polyurethane. By virtue of the mechanical interlock effected by the multitude of thin fibers, a superior bond between the polyurethane and both the tile and steel layers is achieved and an otherwise conventional injection molding technique is rendered feasible in the formation of the laminated article.

Another object is to provide a laminated panel comprising a number of abrasion resistant cylindrical ceramic tiles preferably of circular or hexagonal cross-sectional and of comparatively small diameter approximately equal to an inch plus or minus a half inch, arranged side-by-side with their principal axes parallel to provide a ceramic wear resistant surface that it also very shock or impact resistant. The surface of each tile is bonded as described herein to the elastomeric polyurethane cushioning support, which in turn may be similarly bonded to a sheet steel backing.

The separate tiles are preferably spaced by and bonded to intervening extensions of the polyurethane support and are independently cushioned by the polyurethane such that the major area of the wear resistant panel is shielded from severe localized shocks. A blow or sudden force to any one tile, for example, directed against its exposed end at the wear resistant surface will be transmitted through that tile and absorbed by the polyurethane support without significantly transmitting the force of the blow to the radially adjacent tiles.

Other objects of this invention will appear in the following description and appended claims, reference being had to the accompanying drawings forming a part of this specification wherein like reference characters designate corresponding parts in the several views.

THE PRIOR ART

The following United States patents are representative of the state of the art known to applicant:
U.S. Pat. No. 2,931,751 to DuFresne;
U.S. Pat. No. 3,433,284 to Webbere et al;
U.S. Pat. No. 3,444,033 to King;
U.S. Pat. No. 3,646,180 to Winnick;
U.S. Pat. No. 3,715,417 to Pope;
U.S. Pat. No. 4,060,581 to Darby et al; and
U.S. Pat. No. 4,115,501 to Yano.

Some of the foregoing patents disclose ceramic tiles or similar articles cemented by an epoxy resin to a polyurethane support and additionally secured thereto by some sort of a mechanical interlock, such as a fabric layer or roughened surface impregnated with the polyurethane and/or the epoxy resin. The art was well aware that uncured polyurethane in contact with practically all hard surfaces, including tile, epoxy resins, steel and such synthetics as nylon and rayon, has very little adhesion to such surfaces after it hardens. Accordingly, even for such articles as ceramic wall tile where the ceramic is not subject to abuse and need merely be passively held against displacement by its own weight, some sort of mechanical interlock as taught by the above patents has been required to secure the polyurethane to a resin adhesive.

The above art is not concerned with the bonding of polyurethane to a hard smooth surface such as sheet steel or an abrasion resistant ceramic tile where the primary purpose is to provide a panel or other article capable of withstanding severe abuse, abrasion, shock and shearing forces tending to tear the tiles from the polyurethane, as for example in the lining of an ore chute, and none of the mechanical interlocks suggested by the above patents, nor the primers and adhesives known to the art, have been adequate in the least for securing polyurethane to such surfaces in a manner comparable to the present invention.

At the outset, polyurethanes of the type suitable for use as an elastomeric cushioning support are also readily yieldable, in contrast to the concrete bonded by Darby or the cast steel bonded by Webbere et al, and would readily yield resiliently and pull away from the bonding aggregates taught by the latter patents. In any event, it is apparent from the state of the art, perhaps because of polyurethane's poor affinity for such synthetics as nylon and rayon, that the art was entirely unaware that a bond between a resin adhesive and the polyurethane superior to the tear strength of the polyurethane itself could be obtained with the aid of a multitude of tiny fibers, including fibers made from the aforesaid synthetics, mechanically interlocking the resin adhesive and polyurethane as taught the first time by applicant.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
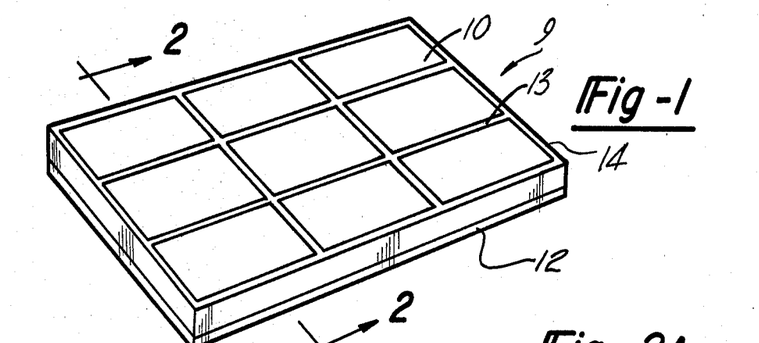
FIG. 1 is a plan view in perspective of an abrasive and impact resistant panel module embodying the present invention, and like the following figures is for the purpose of illustration, not to scale.

Referring to the drawings, FIG. 1 illustrates a laminated article 9 embodying the present invention and comprising by way of example a plurality of rectangular abrasion resistant tiles 10 bonded to a polyurethane elastomeric cushioning support 11 which in turn is bonded to a smooth hard supportive surface 12 comprising a sheet steel base or backing. The resulting article 9 comprises a panel module approximately a foot square or in some instances one by one and one-half feet, adapted to be arranged side-by-side to cover an area subject to abrasion.

The tiles 10 may be conventional, comprising approximately 85% to 90% or more aluminum oxide compacted under severe pressure with a binder and usually small amounts of silicon oxide and other materials to the desired shape, which in the present instance may be 4"×4" or 4"×6" rectangles approximately 1" thick. The area of the surface 10a exposed to abrasion and the thickness of the tiles will depend upon the type of abrasion and the impact forces to be resisted. The one inch thick tiles illustrated in FIG. 1 are particularly useful for heavy duty, wear-resistant modules used by the mining industry. Thinner tiles approximately ⅜" thick are useful in lighter operations, as for example for lining chutes in grain elevators. A number of such tiles are preferably arranged side-by-side and spaced at 13 approximately 1/16" to ⅛" by integral extensions of the polyurethane support 11. An integral edge extension 14 of the polyurethane support may be somewhat thicker, as for example up to a ¼". Preferably the edge extensions 14 and the polyurethane in the spaces 13 extend upwardly in FIG. 2 from the support 11 to lie flush with the exposed tile surfaces 10a.

Figures 2, 2A, 3, 4, 5, 6, 7:
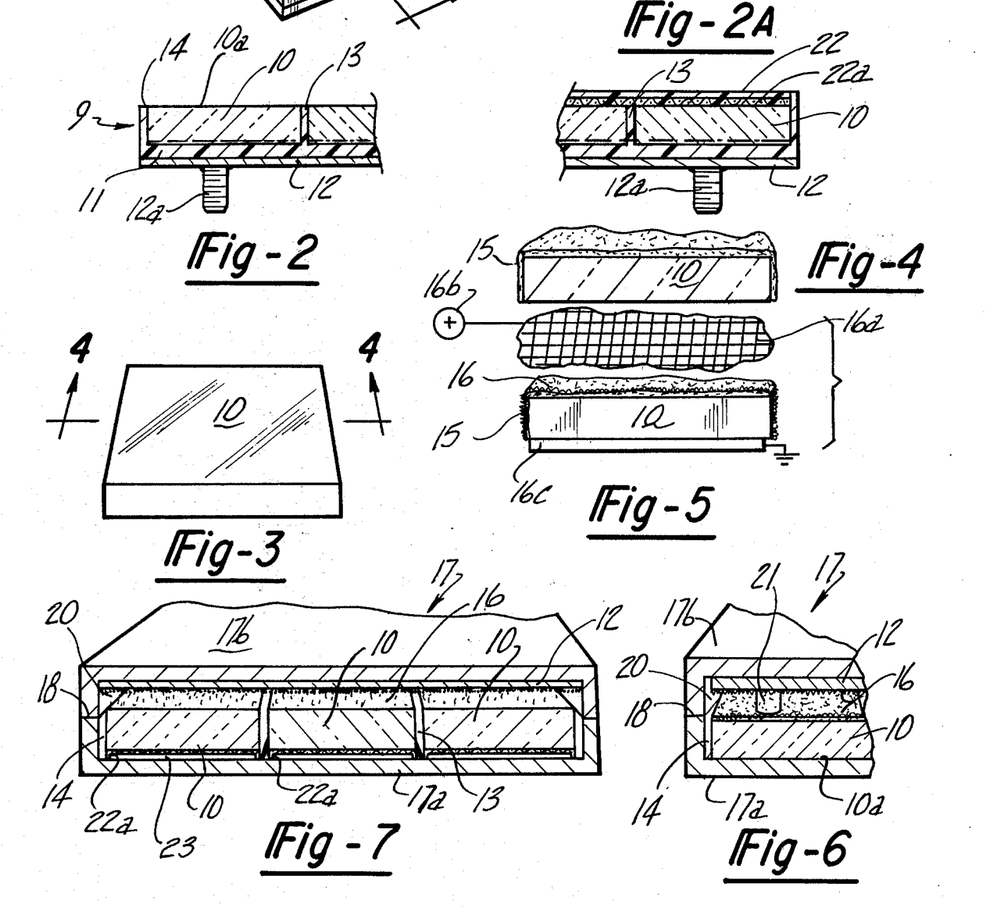
FIG. 2 is a sectional view taken in the direction of the arrows substantially along the line 2—2 of FIG. 1.
FIG. 2A is a view similar to FIG. 2, showing a modification.
FIG. 3 is a perspective view of a member, which may be a ceramic tile or a steel plate by way of example, having a smooth hard surface intended to be bonded to a polyurethane layer.
FIG. 4 is a sectional view taken in the direction of the arrows substantially along the line 4—4 of FIG. 3, illustrating the member of FIG. 3 after it has been coated with a thin coating of an uncured liquid epoxy resin.
FIG. 5 is a schematic view similar to FIG. 4, showing the member of FIG. 4 after selected surfaces coated as in FIG. 3 have been dusted with a multitude of short thin fibers.
FIG. 6 is a schematic fragmentary view in perspective showing a portion of a ceramic tile and sheet steel backing arranged within an injection mold cavity prior to injection of polyurethane to complete the laminated article of FIG. 1. Selected surfaces of the tile and of the sheet steel have been coated with epoxy resin as in FIG. 4 and dusted with a plurality of fibers as in FIG. 5. The epoxy resin has been at least partially cured to secure the fibers embedded therein.
FIG. 7 is a view similar to FIG. 6, illustrating a modification.

The polyurethane 11 between the tile 10 and backing 12 closely conforms to the proximate surfaces of the latter members and may be approximately ⅛" thick if bonding is the only consideration. The thickness will be increased for greater impact resistance and may be approximately ⅜" for the high impact panels described herein. The thickness of the steel backing 12 may be approximately ⅛" for typical applications but may be increased to ⅜" for heavy duty and high impact uses. The backing 12 is co-extensive with both the upper wear-resistant facing of the module 9 in FIG. 1 and also with the polyurethane support 11 which spaces the base 12 from the tiles 10. The backing 12 provides a hard protective layer for the softer polyurethane 11 and also provides a surface to which welding studs 12a may be attached if desired. For some applications, the hard backing surface 12 may comprise materials other than sheet steel and may in some instances be eliminated.

Not clearly shown in FIGS. 1 and 2, but described in detail below, is a very thin adhesive 15 that may comprise an epoxy resin bonding layer preferably not more than a few thousandths of an inch thick between the polyurethane 11 and the adjacent surfaces of the tiles 10 and backing 12. Partially embedded within the resin layers 15 and providing a positive mechanical interlock with the adjacent polyurethane 11 are a multitude of very short and thin fibers 16, as for example approximately 300,000 per square inch. The epoxy resin may be conventional and is selected so that when applied in an uncured liquid condition to the smooth surfaces of either the tiles 10 or the backing 12 and cured thereon, it will firmly bond thereto.

The individual fibers 16 are approximately three hundredths of an inch or three quarters of a millimeter long and approximately 3.0 Denier, which amounts to approximately 0.00007 of an inch in diameter. The fibers are selected from materials which are adapted to be readily wet by the uncured liquid epoxy resin, as for example cotton fibers or preferably synthetic fibers such as nylon or rayon, by way of example, which tend to be stronger and straighter than the cotton fibers and thus tend to achieve a superior mechanical interlock between the resin 15 and the polyurethane 11. The length of the fibers is approximately ten times the thickness of the resin layer, which is preferably about two or three thousandths of an inch, so that on average approximately a tenth of the length of each fiber 16 is embedded within the adhesive 15 and the remainder is embedded in the adjacent polyurethane 11.

Preferably the resin 15 and interlocking fibers 16 cover the entire surfaces of the tiles 10 and backing 12 in contact with the polyurethane 11, including the vertical walls of the tiles 10 defining the spaces 13 and edge 14. As a result, an extremely effective cushioning support is provided for the tiles 10 that renders them highly resistant to displacement from the support 11 by shearing forces and to cracking or chipping by impact forces.

Figures 8, 9, 10, 11:
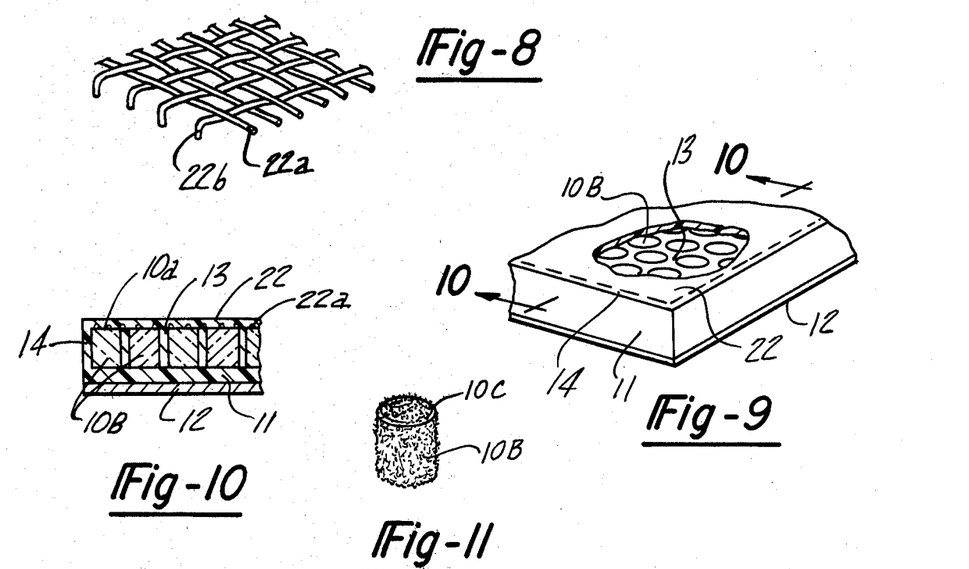
FIG. 8 is a perspective view of the wire cloth or screen illustrated in FIG. 7.
FIG. 9 is a view similar to FIG. 1, illustrating another modification which is particularly adapted for shock or impact resistance.
FIG. 10 is an enlarged fragmentary sectional view taken in the direction of the arrows essentially along the line 10—10 of FIG. 9.
FIG. 11 is a perspective view of one of the cylindrical tiles of FIG. 9 after having been coated with resin and dusted with fibers as in FIG. 5.
Figure 12:
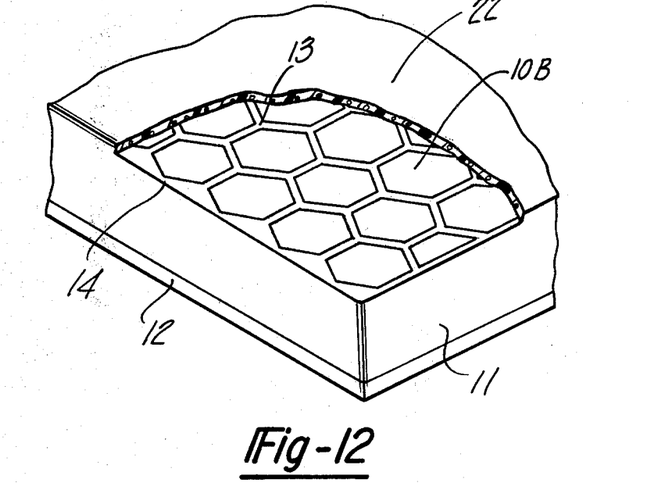
FIG. 12 is a view similar to FIG. 9, showing a modification.

For example, a 12 pound cast steel grinding ball dropped from as low as four feet on one of the tiles 10 supported on an ordinary hard surface will shatter the tile into many pieces. The high impact resistance tile described herein and cushioned by the polyurethane 11, 13, 14 as illustrated in FIGS. 9 and 12 will not even be chipped when the same ball is dropped thereon from a height of over sixteen feet.

Furthermore, the above described bond between the polyurethane 11 and either the tiles 10 or the steel backing 12 is superior to the shear strength of the polyurethane itself. The effectiveness of the bond and of the impact resistance are particularly desirable for most abrasion resistant articles because impact forces and abrasion are commonly encountered together in industrial applications. The tumbling movement of heavy rough aggregates along a chute or within a hopper tend to wear away the exposed polyurethane at the locations 13 and 14 more rapidly than the tile surfaces 10a. In consequence of such wear, edges of the tiles 10 at their upper surfaces 10a eventually project above the adjacent polyurethane into the path of the moving aggregate. Except for the effectiveness of the bond to the polyurethane 11, the tiles 10 would soon be ripped from the panel modules 9.

The physical properties of the polyurethane may be varied somewhat to provide a suitable compromise between abrasion resistance and shock absorbing qualities. A particularly satisfactory polyurethane used in the laminated panel module 9 of FIG. 1 is in the MDI urethane polyester system cured with a 1,4 butanediol; has a hardness of 85 shore A durometer according to the American Society for Testing Materials (ASTM) test D2240; a tensile strength of 5500 psi measured by ASTM test D412-die C; a tear strength of 700 pli by ASTM test D624-die C; and an elongation factor of 100% at 1000 psi, 200% at 1400 psi, 300% at 2000 psi, and an ultimate elongation of 500% before rupturing. Of course, as far as shock absorbing qualitites are concerned, other elastomers besides polyurethanes may be used and bonded to the tile as described herein, such as polyvinyls for example. The polyurethanes are preferred because of their toughness and abrasion resistance.

The panel module 9 of FIG. 1 may be fabricated in accordance with the present invention by suitably applying a thin coating of the epoxy resin in a liquid uncured state to the surfaces of the member that is to be bonded to the polyurethane, such as the tile 10 or backing 12. The liquid resin may be sprayed or brushed on to achieve the desired thickness of approximately two or three thousandths of an inch. A thicker layer may be applied, but the excess epoxy will be a waste and could reduce the ultimate strength of the bond.

An expedient method for applying the liquid resin is to preheat the member to be bonded to the polyurethane, whether the tile 10 or sheet steel backing 12, to about 175° F. to 200° F. Thereafter if an excess of the resin is applied, the temperature of the preheated member will reduce the viscosity of the resin and eneable the excess to drain off.

FIG. 3 illustrates a member to be coated with the uncured liquid resin. The member in FIG. 3 comprises one of the individual tiles 10 by way of example, although it could just as well be the sheet steel backing 12 or another member. Prior to applying the epoxy resin, the member 10 in FIG. 3 may be heated to approximately 175° F. or 200° F. and thereafter dipped into the resin, or in the alternative the latter is brushed or sprayed on the member 10. The excess resin if any is allowed to drain off.

Preferably the cement in the coating 15 comprises a heat blocked, single component epoxy resin having a curing threshhold of approximately 250° F. Although the single component heat blocked resin is preferred because of the ease by which it can be applied and the simplicity of controlling the curing process, a dual epoxy resin could be pre-mixed and applied to the member of FIG. 3 as described above. Other cements that may be applied in a liquid state and that when dry will adhere firmly to the tiles 10, sheet steel 12, and embedded fibers 16 may be used for the layer 15, but the thermosetting epoxy resin has been found to be very satisfactory. It is preferred because of the ease by which it can be used and especially because it is essentially free of volatile solvents and undergoes very little shrinkage from its liquid to its hardened state.

In any event, after application of the cement layer 15 and while it is still in its liquid state, a multitude of the fibers 16 described above are dusted on the wet surface 15, so that those portions of the fibers in contact with the liquid cement will be wet thereby and absorbed therein. An excess of the fibers 16 is preferably applied to achieve a maximum fiber density in the neighborhood of 300,000 fibers per square inch in contact with the resin. Within a few seconds, the proportions of the fibers in contact with the cement or resin will have been wet thereby. The fiber coated member 10 of FIG. 5 is then baked at between 250° F. and 450° F. until the resin 15 is at least partially cured and firmly bonded to the tile 10 and to the portions of the fibers 16 embedded therein. Because of the thin resin coating 15, on average approximately a tenth of the length of the separate fibers 16 will be embedded within the resin. The remaining length of the separate fibers will project outwardly somewhat as illustrated schematically in FIG. 5 for interlocking with the polyurethane as described below.

The fibers 16 may be dusted directly on the wet resin 15 of FIG. 15, as for example by gravity feet or by being blown thereon by light air pressure, or they may be fed by gravity or blown downwardly through an electrostatic field, as for example an electrical conducting wire mesh grid 16a positively charged as indicated at 16b. The charged mesh 16a preferably overlies the member 10 in FIG. 5. A grounded electrical conducting plate 16c underlies the later member 10 if it is dielectric. If the member to be fiber coated in FIG. 5 is a sheet plate, the latter may be grounded directly and the plate 16c will not be used.

As the fibers 16 pass downwardly through the grid 16a, they are positively charged and thereafter attracted toward the grounded plate 16c. The charged fibers 16 are intercepted by the liquid resin coated member 10 and tend to affix themselves endwise. The result is to minimize matting of the fibers 16 on the resin layer 15 and to effect a superior fiber orientation for subsequently bonding to the polyurethane 11 as described below.

For each panel module 9 to be fabricated, the several tiles 10 and sheet steel backing 12 required are treated as described above so that when the tiles 10 and backing 12 are arranged as in FIG. 6 in an injection molding die 17, the resin fiber coating 15, 16 will cover their confronting surfaces and also the vertical edge surfaces of the tiles 10.

The several fiber coated tiles 10 required for a panel module 9 are then laid with their fibers 16 extending upwardly FIG. 6 on the lower platen 17a of a two part injection molding die 17. The tiles 10 are spaced from each other as at 13, FIG. 7, and a marginal clearance 14 is provided between the inner periphery of the die 17 and the adjacent edges of the tiles 10. An upper platen 17b of the die 17 is arranged to meet the platen 17a along a partition line 18 and to provide a mold cavity 20 therebetween. Prior to closing the die 17, a plurality of spacers 21, which may comprise resilient polymerized polyurethane portions compatible with the polyurethane support 11 of FIG. 1, are arranged on the tiles 10. The fiber coated sheet steel backing 12 is then laid with its fibers extending downwardly on the upper ends of the spacers 21.

The die 17 is then firmly closed to bring the portions 17a and 17b together along the parting line 18 and to clamp the resiliently yieldable spacers 21 tightly between the tiles 10 and backing 12. At the closed position of the die 17, the space 20 between the tiles 10 and backing 12 equals the thickness of the polyurethane layer 11 of FIG. 2, except for slight shrinkage of the polyurethane as it cures. Liquid uncured polyurethane as described above having a viscosity of approximately 300 centipoise is injected at approximately 200 psi in accordance with conventional injection molding practice to fill the space 20 and the spaces 13 and 14 and cause the fibers 16 to be embedded into the adjacent portions of the polyurethane. The filling of the spaces 13, 14 and 20 under the pressure aforesaid takes but a fraction of a second. Thus the tiles 10 and backing 12 must be held firmly by the spacers 21 against the corresponding die platens 17a and 17b in order to prevent displacement during the polyurethane injection. The preferred high molding pressure assures a rapid molding operation and also assures that the portions of the fibers 16 projecting from the resin layer 15 are completely embedded within the adjacent portions of the polyurethane. However, the fiber reinforced bond is so effective that in some applications, as for example, in the field or at the construction or installation site, unpolymerized polyurethane can be poured under atmospheric conditions into contact with the resin-fiber coated surface 15, 16 within a suitable mold. When the polyurethane cures, it will be effectively bonded to the resin-fiber surface.

FIG. 7 illustrates a modification wherein the tile 10 and backing 12 treated as described above to provide the resin coating 15 and embedded fibers 16 are arranged in the mold 17 essentially as described above, except that instead of the spacers 21, suitable means not shown, as for example magnetic means support the backing 12 in place. The tiles 10 are held in place and spaced from the platen 17a by a steel grid or coarse steel wire screen 22a, FIG. 8.

The grid 22a may be approximately 1/16" thick with approximately ¼" apertures. It is spaced at 22b approximately 1/16" above the platen 17a, as for example by projections of the die 17 or downwardly bent legs of the grid 22a. Prior to applying the fiber coating 16, either the grid 22a or the wear surfaces 10a of the tiles 10 are coated with an uncured liquid epoxy resin. The tiles 10 are then arranged on the grid 22a with their surfaces 10a confronting the latter and in the patterns desired for the resulting panel module, i.e., to provide the polyurethane filled spaces 13 and 14. The resin is then cured to cement the tiles 10 to the grid 22a.

The same epoxy resin used for the layer 15 may also be used to bond the screen 22a to the tile faces 10a, in which case, after the tiles 10 are arranged on the screen 22a, the fiber coating 16 is applied and the resin 15 is cured as described above to secure the fibers 16 and also to cement the tiles to the screen 22a. The assembled grid 22a and tiles 10 and also the backing 12 are then placed in the die 17 as illustrated in FIG. 7 and the molding operation is completed as above described.

When the pressurized liquid polyurethane is forced into the mold cavity 20, the polyurethane will work its way between and around the tiles 10 and fill the space between the platen 17a and the confronting tile surfaces 10a, thereby to encapsulate the screen 22a and provide a comparatively low friction exterior surface or a sacrificial layer 22 for the abrasion-resistant surface of the resulting panel, FIG. 2A. The sacrificial layer 22 bonded to the tile faces 10a by the resin-fiber coating 15, 16 is provided because the surface of each tile 10 prior to being worn by abrasion has a high coefficient of friction that retards movement of an aggregate until that surface is eventually worn smooth by repeated abrasion. Where such a condition is a problem, the sacrificial layer 22 comprising a thin coating of the polyurethane is provided. The aggregate freely rides along the comparatively low friction polyurethane surface and gradually wears it away by abrasion. As the sacrificial layer 22 gradually wears away, the underlying ceramic surface 10a is gradually polished. By the time the polyurethane is completely worn away, the exposed ceramic surface 10a is highly polished and presents a low friction surface. In lieu of the wire mesh 22a, a stiff perforated paper or other comparable material may be bonded to the tiles 10 to hold them in place and space them from the platen 17a as described during the molding operation, and thereby to provide a sacrificial layer comparable to the layer 22.

Modifications of the abrasion resistant panel of FIG. 2A are illustrated in FIGS. 9-12 comprising panel modules that are particularly resistant to severe impact. In each modification, a plurality of tiles 10B are supported on and bonded to a polyurethane elastomeric support 11 which in turn is bonded to a sheet steel backing 12 substantially as described above. The distinction in FIGS. 9-12 is that the tiles 10B are comparatively small cylinders generally of circular or hexagonal cross-section, preferably about three-quarters of an inch in diameter and length, though these dimensions may feasibly range from one inch plus or minus a half inch. If desired, the peripheries of the ends 10a of the tiles 10B may be chamfered slightly as at 10c, FIG. 11, to minimize chipping. Otherwise the tiles in FIGS. 9-12 are essentially the same as the tiles 10.

In the fabrication of the FIGS. 9-12 panels, each of the cylindrical tiles 10B, FIG. 11, is coated with a single component temperature blocked epoxy resin layer 15 which is applied to the cylindrical wall and end surfaces of each tile 10B. While the resin coating is still liquid, the fiber coating 16 is dusted thereon to cause portions of the fibers in intimate contact with the resin to be wet thereby. Thereafter the resin-fiber coated tiles 10B are baked at elevated temperature as before to cure or at least partially cure the resin coating 15 and bond the latter to the fibers embedded therein and to the tiles 10B. The procedure for applying the resin coating 15 and fiber coating 16 to the tiles 10B and to the sheet steel backing 12, when the latter is desired, and for blowing off the excess fibers 16 may be the same as described above in regard to FIGS. 1–8.

After applying the resin layer 15, the tiles 10B may be arranged on the screen 22a in the pattern desired for the final panel, as illustrated for example in FIGS. 9–12 and with their surfaces 10a confronting the screen 22a. The fibers 16 may then be dusted on the tiles 10B as described. The screen 22a with the fiber coated tiles 10B thereon is then baked as described to cure the resin, to secure the fibers, and to cement the tiles 10B in the desired arrangement on the screen 22a.

In the alternative, the tiles 10B may be arranged on the screen 22a and cemented thereto by coating the screen 22a with the liquid resin either before the resin layer 15 is applied or after the fiber impregnated resin layer 15, 16 is cured.

After the tiles 10B have been coated with the resin-fiber layer 15, 16 and have been cemented to the screen 22a, the assembly along with the resin-fiber coated backing 12, if the latter is desired, is placed in the mold 17 as in FIG. 7 and the injection of the polyurethane is completed as described above. The screen 22a cemented to the small cylindrical tiles 10B, which may number approximately 200 per square foot, provides convenient means for holding the tiles 10B in place against the force of the injected polyurethane. The depending legs 22b or other suitable means space the tile faces 10a from the platen 17a to provide the thin polyurethane sacrificial layer 22.

The comparatively large cylindrical surface area of each small tile 10B in FIGS. 9–12 with respect to its volume assures that its support and retention within its respective socket defined by the adjacent polyurethane 11, 13, 14 to which it is bonded is far superior to the corresponding support provided for the tiles 10. This factor among possibly others in cooperation with the absence of corners, such as the corners of the tiles 10 which tend to produce uneven stress patterns, result in an impact resistant panel module that has been amazing to personnel familiar to the trades involved. Any localized impact by a heavy tumbling or falling aggregate against the FIG. 9 panel module will usually strike only one of the tiles 10B. The latter will transmit the force of the impact to the yieldable polyurethane 11 without transmitting any significant force laterally, i.e., radially to the adjacent tiles 10B.

In the above regard, the ceramic material has appreciable crush resistance or load supporting ability but very little yieldability without cracking. The tile can withstand a large pressure distributed over a comparatively long time span, but would crack or spall under the same force when received in a comparatively short time interval. The effect of a localized impact against a tile 10B of a small cross-sectional area will be significantly reduced by the structures shown in FIGS. 9–12. When such an impact is transmitted to the underlying polyurethane 11, the latter will yield in accordance with the size of the force, thereby to distribute the force over an extended time interval. Other factors are involved, but the end result is that an impact of short duration that would crack or spall the tile is reduced to a smaller force per unit of time that does not injure the tile.

By way of comparison, the same localized impact striking the larger tile 10 illustrated in FIG. 1 would be distributed over a greater area of the underlying polyurethane 11. The force of the impact per unit of area transmitted to the polyurethane 11 will thus be smaller than the corresponding force of the same impact striking one of the smaller tiles 10B, the polyurethane supporting the larger tile 10 will yield less, and the effective localized impact per unit of time against the large tile 10 will be greater than the corresponding effective impact per unit of time against the smaller tile 10B. In consequence, the small polyurethane cushioned tile 10B will survive an impact that would spall or crack a similarly cushioned larger tile 10, regardless that the support 11 renders the shock resistance of both tiles 10 and 10B far superior to tiles in comparable panels available heretofore.

Although shock resistance of the individual tiles increases as the diameter decreases, the diameter and length of the tiles are preferably of the same order of magnitude because shock resistance is more important with heavy duty panels. Accordingly the tiles 10B in heavy duty panels will usually be on the order of ¾ of an inch in diameter or more.

In FIG. 12, the cylindrical tiles 10B are hexagonal in cross-section and are arranged so that the intervening polyurethane 13 is of essentially uniform transverse thickness. In other respects the tiles 10b of FIG. 12 and the resulting panel module is the same as described above.

I claim:

1. A laminated article comprising the combination of a form sustaining member, a polymerized elastomer having a liquid state prior to being polymerized, means for securing the elastomer to the member comprising a hardened cement layer bonded to the member and having a liquid state prior to being hardened, the last means also comprising a multitude of short thin fibers of a material that is wetable by both the cement and the elastomer in their liquid states, each fiber having a portion embedded in the cement layer and its remainder embedded in the elastomer.

2. The combination according to claim 1, the elastomer comprising a thermosetting polyurethane, the cement layer comprising a thermosetting cement essentially free of volatile components in its liquid state.

3. The combination according to claim 2, the cement layer comprising an epoxy resin.

4. The combination according to claim 1, the length of the fibers being not more than a millimeter and being at least several times the thickness of the cement layer.

5. The combination according to claim 4, the cement layer comprising an epoxy resin, the member comprising an abrasion resistant ceramic tile, and the elastomer comprising a resiliently yieldable polyurethane shock absorbing layer for the tile.

6. The combination according to claim 5, the tile comprising primarily aluminum oxide, the polyurethane having a hardness of approximately 85 Shore A durometer and a tensile strength on the order of magnitude of approximately 5000 psi, and the length to diameter ratio of the fibers being on the order of magnitude of several hundred.

7. The combination according to claim 4, the member comprising an abrasion resistant ceramic tile essentially of aluminum oxide, the elastomer comprising a resiliently yieldable polyurethane layer in intimate contact with the tile for cushioning impact forces directed against the tile.

8. The combination according to claim 7, the laminated structure comprising an abrasion and comparatively shock resistant panel, the cement layer comprising a cured thermosetting epoxy resin, a sheet steel backing spaced from the ceramic tile by the polyurethane layer and in intimate contact with the latter, and means for securing the polyurethane layer to the sheet steel backing comparable to the first named means for securing the polyurethane layer to the ceramic tile comprising a thermosetting epoxy resin layer bonded to the surface of the sheet steel and in intimate contact with the polyurethane layer and also comprising a second multitude of said fibers embedded within both the polyurethane and last named epoxy layers.

9. The combination according to claim 8, said polyurethane having a hardness of approximately 85 Shore A durometer and a tensile strength of approximately 5000 psi, and the length to diameter ratio of the fibers being on the order of magnitude of several hundred.

10. The combination according to claim 1, the cement layer being not more than a few thousandths of an inch thick, the length of said fibers being at least several times the thickness of the cement layer.

11. The combination according to claim 10, the extent of said fibers embedded in the elastomer being at least several times the extent of said fibers embedded in the cement layer.

12. The combination according to claim 11, the laminated article comprising an abrasion and comparatively shock resistant panel, the member comprising an abrasion resistant ceramic tile having a wear resistance surface and an opposite cushioned surface spaced by a peripheral edge surface, the elastomer comprising a resiliently yieldable thermosetting cushion for the tile and being secured to the cushioned and peripheral edge surfaces in intimate contact therewith by said cement layer and fibers, the cement layer comprising a thermosetting cement essentially free of volatile components in its liquid state, and the length of the fibers being on the order of magnitude of approximately a millimeter or less.

13. The combination according to claim 1, the member comprising one of a plurality of cylindrical abrasive resistant ceramic tiles having their cylindrical walls closely spaced with their axes parallel and with one axial end of each defining a wear resistant surface, the cross sectional area of each tile transverse to its axis being on the order of magnitude of approximately two square inches or less, the axial length of each tile having the same order of magnitude as its diameter, the elastomer comprising a polyurethane shock absorbing cushion for each tile in intimate contact with the axial end of the latter opposite said wear resistant surface and having portions extending between and spacing the cylindrical walls of the tiles to provide a separate socket closely confining each tile, the cement layer for each tile comprising a thermosetting epoxy resin coextensive with the associated socket, the multitude of fibers comprising a coating for each tile also coextensive with the associated socket.

14. The combination according to claim 13, the cement layer being not more than a few thousandths of an inch thick, the length of said fibers being at least several times the thickness of the cement layer and on the order of magnitude of a millimeter or less.

15. The combination according to claim 14, said polyurethane having a hardness of approximately 85 Shore A durometer and a tensile strength of approximately 5000 psi.

16. The combination according to claim 15, the fiber embedded resin layer also covering the wear resistant surfaces of said tiles and the latter surfaces defining a common plane, the polyurethane also covering said wear resistant surfaces and being bonded to the adjacent fiber embedded resin layer and comprising a thin comparatively low friction sacrificial layer adapted to be worn away by repeated abrasion.

17. The combination according to claim 3, the resin layer entirely covering said member, the latter comprising an abrasion resistant ceramic tile having a plane wear resistant surface, the multitude of fibers comprising a coating for each tile entirely covering the resin layer, the polyurethane encapsulating said tile and comprising a shock absorbing cushion therefore, the polyurethane covering said plane wear resistant surface comprising a thin comparatively low friction sacrificial layer adapted to be gradually worn away by repeated abrasion.

18. The method of fabricating a laminated article comprising a member of form sustaining material, a cement adapted to bond to said member when applied thereto in a fluid state and thereafter hardened, and an elastomeric layer comprising a curable elastomer having a fluid state, the steps of applying a thin layer of said cement in its fluid state to said member, covering the fluid cement layer with a multitude of short fibers of a material that is wetable by the fluid cement, allowing portions of the separate fibers to come into intimate wet contact with the fluid cement while enabling the remainder of the separate fibers to project outwardly from the fluid cement, enabling the fluid cement to harden to afix thereto the portions of the fibers in intimate contact therewith while said remainder project outwardly from the cement, forming the elastomeric layer by pouring the elastomer in a fluid state on the hardened cement to embed said remainder of the fibers into the fluid elastomer, and curing the elastomer with said remainder embedded therein to effect an interlock between the elastomeric and cement layers.

19. The method according to claim 18, providing a cement that hardens from the fluid state with nominal change in volume and applying the cement to said member in a layer not more than a few thousandths of an inch thick, providing fibers that are at least several times as long as the thickness of the cement layer, covering the fluid cement layer with a number of the fibers that is in excess of the number thereof that are wet by the fluid cement, and after the cement has hardened to afix the portions of the fibers in intimate contact therewith, blowing the excess fibers from the cement.

20. The method according to claim 18, wherein said laminated article comprises an abrasion resistant panel, the steps of providing a sheet steel backing for said member, a thermosetting epoxy resin for said cement, fibers not greater than approximately a millimeter in length a thermosetting polyurethane for the elastomeric layer, and a plurality of abrasion resistant ceramic tiles comprising primarily aluminum oxide, each tile having a plane wear resistant surface and an opposite cushioned surface spaced by a peripheral edge surface, applying said resin in a liquid state to effect a layer not greater than a few thousandths of an inch thick on one surface of the backing and on the cushioned and peripheral edge surfaces of the tiles, covering the entire area of said liquid resin layer with said fibers, arranging said tiles with their peripheral edges in closely spaced edge-to-edge relationship and with their wear resistant surfaces in a common plane and with their cushioned surfaces confronting and spaced from the resin-fiber layer of the backing by the distance desired for the thickness of the elastomeric layer, forcing the polyurethane in an uncured liquid state into the space between said backing and tiles and between said closely spaced peripheral edge surfaces with sufficient pressure to embed said outwardly projecting remainder of the fibers into the fluid polyurethane, whereby an interlock between the cured polyurethane and backing and between the closely spaced peripheral edges of the tiles is effected and a shock absorbing cushioning layer between the tiles and backing and between said closely spaced peripheral edges is also effected.

21. The method according to claim 18, preheating said member sufficiently to reduce the viscosity of the fluid cement applied thereto and to assure the coating of said member with a thin layer of said fluid cement when the latter is allowed to drain from said member, and allowing said fluid cement applied to said preheated surface to drain therefrom to effect said thin layer.

22. The method according to claim 21, providing fibers having lengths at least several times the thickness of the hardened cement layer and on the order of magnitude of a millimeter or less.

23. The method according to claim 22, effecting an electrostatic charge on said fibers in contact with the fluid cement to enhance the outwardly projection of said remainder of the fibers from the fluid cement.

24. The method according to claim 23, providing a thermosetting epoxy resin for the cement, a polyurethane for the elastomer, and fibers having a Denier of approximately 3.

25. The method according to claim 24, wherein said laminated article comprises an abrasion resistant panel, the steps of providing a sheet steel backing for said member, applying said fluid resin layer to one surface of said backing, applying said fibers to completely cover the fluid resin layer providing a plurality of abrasion resistant ceramic tiles comprising essentially aluminum oxide, each tile having a plane wear resistant surface and an opposite cushioned surface spaced by a peripheral edge surface, providing a hardened epoxy resin-fiber layer to said cushioned and peripheral surfaces in accordance with the method of providing the similar layer for said backing, supporting the tiles in closely spaced side-by-side relation with their cushioned surfaces confronting the resin-fiber layer of the backing and spaced therefrom by a distance equal to the thickness desired for the elastomeric layer and with their wear resistant surfaces in a common plane, forcing the polyurethane in an uncured fluid state into the space between said backing and tiles and between the closely spaced peripheral edge surfaces with sufficient pressure to embed said outwardly projecting remainder of the fibers into the fluid polyurethane, whereby an interlock between the polyurethane and backing and also an elastomeric shock absorbing layer between the tiles and backing and between the closely spaced peripheral edges of the tiles are effected when the polyurethane is cured.

26. The method according to claim 25, providing a thermosetting polyurethane for said elastomer having a hardness and tensile strength on the order of magnitude of approximately 85 Shore A and 5000 psi respectively, and providing said fibers having a length to diameter ratio on the order of magnitude of several hundred.

* * * * *